United States Patent [19]
Dequin et al.

[11] Patent Number: 6,123,291
[45] Date of Patent: Sep. 26, 2000

[54] DEVICE FOR CONTROLLING AN AERODYNAMIC SURFACE FOR BALANCING A HELICOPTER IN TERMS OF PITCH

[75] Inventors: André-Michel Dequin, Aix-en-Provence; Valéry Lionel Delisle, Pourrieres, both of France

[73] Assignee: Eurocopter, Marignane Cedex, France

[21] Appl. No.: 09/200,927

[22] Filed: Nov. 30, 1998

[30] Foreign Application Priority Data

Dec. 1, 1997 [FR] France ................................. 97 15072

[51] Int. Cl.⁷ .................................................. B64C 13/00
[52] U.S. Cl. ........................................ 244/17.13; 244/232
[58] Field of Search ........................... 244/17.13, 17.19, 244/21.39, 232

[56] References Cited

U.S. PATENT DOCUMENTS

| | | | |
|---|---|---|---|
| 2,680,579 | 6/1954 | Hohenemser | 244/17.13 |
| 2,941,792 | 6/1960 | Stutz | 244/17.13 X |
| 3,385,537 | 5/1968 | Lichten et al. | 244/17.13 X |
| 4,304,375 | 12/1981 | Builta et al. | 244/17.13 |

FOREIGN PATENT DOCUMENTS

| | | |
|---|---|---|
| 844048 | 7/1939 | France . |
| 1266797 | 6/1961 | France . |
| 657796 | 9/1951 | United Kingdom . |

OTHER PUBLICATIONS

Bob Kefford: "The UH–60A Black Hawk: A World–Wide Force Multiplier" Aircraft Engineering., vol. 54, No. 10, Oct. 1982, pp. 9–15, XP002074048 London, GB.

*Primary Examiner*—Robert P. Swiatek
*Attorney, Agent, or Firm*—Stevens, Davis, Miller & Mosher, L.L.P.

[57] ABSTRACT

A device for controlling an aerodynamic surface (E) for balancing in terms of pitch a helicopter (He) including a main rotor (R1), the fore-and-aft cyclic pitch of which is controllable by a pitch-control channel (3A) as a function of a pitch control command. According to the invention, the device includes a unit (1A) associated with the control channel (3A) for controlling the aerodynamic surface (E) in such a way that it generates lift that represents part of a command dependent on the pitch-control command, which part can be executed by the aerodynamic surface (E), and the combined pitching action of the aerodynamic surface (E) and of the main rotor (R1) represents the pitch-control command.

21 Claims, 3 Drawing Sheets

DEVICE FOR CONTROLLING AN AERODYNAMIC SURFACE FOR BALANCING A HELICOPTER IN TERMS OF PITCH

BACKGROUND OF THE INVENTION

1. Field of the Invention

The present invention relates to a device for controlling an aerodynamic surface for balancing a helicopter in terms of pitch.

2. Description of the Related Art

It is known that in hovering flight, balancing the pitching moment of the helicopter with respect to a fixed point involves two main components: the moment due to the weight of the aircraft and the moment due to the main lift and propulsion rotor which, for a given mass, is proportional to the tilting of the rotor with respect to the plane perpendicular to the rotor mast. Thus, variations in the center of gravity of the helicopter give rise to variations in the balanced attitude.

It is also known that when the helicopter is in cruising flight, another component of the pitching moment comes into play, namely the aerodynamic moment exerted on the cell. In the case of a fuselage, this component has a destabilizing effect, that is to say that for a variation in incidence there is produced an aerodynamic pitching moment on the fuselage which tends to move it away from its position of equilibrium. The consequence of this unstable component is that of increasing the variations in attitude which are associated with the center of gravity compared with those which exist in hovering flight.

These variations in attitude have negative consequences. Excessively nose-down attitudes considerably increase the drag of the helicopter and therefore reduce its maximum speed. They also lead to a feeling of discomfort for the crew and passengers. Excessively nose-up attitudes lead to high moments on the mast and hub of the main rotor, which affects the life of these components.

To improve the balance of the helicopter in terms of pitching moment, it is known practice to have an aerodynamic surface for pitch attitude control placed toward the rear of the aircraft and which compensates for the instability of the pitching moment on the fuselage.

In consequence, to obtain a balancing empennage which is efficient, its configuration needs to be defined in such a way as to master the compromise between the two aforementioned constraints (performance/hub loading) which are, moreover, contradictory. In effect, to optimize the performance at high speed, said aerodynamic surface needs to be formed in such a way that it yields an attitude close to zero attitude, and this is penalizing on the moments at the center of the hub, where it is desirable to have a very nose-down attitude in order to reduce the fore-and-aft flapping.

In addition, the compromise obtained needs to be satisfactory for various mass, altitude and center of gravity scenarios and possibly for the various possible external aerodynamic configurations.

One solution, in an attempt to satisfy the aforementioned conditions, is to increase the efficiency of said empennage, that is to say increase its area, so as to reduce the effects of the disturbances that the variations in mass and center of gravity constitute.

However, such a solution is limited, particularly by certain constraints associated with the area of the empennage, namely, in particular:

- a constraint known as the "attitude hump", which is due to the interactions between the rotor and the empennage at low speeds and which results in a nose-up effect which can reduce visibility during an approach. To solve this problem, either the area of said empennage has to be restricted or this empennage has to be turned, if possible, so as to reduce its angle of incidence during these interactions;
- a constraint associated with the coupling when climbing/diving, which depends directly on the area of the empennage, whose angle of incidence in oblique flight causes a substantial pitching moment variation and results in substantial variations in the attitude and in the position of the fore-and-aft cyclic stick; and
- constraints of size and in the folding of the tail boom in the case of a helicopter on board a carrier, for example.

SUMMARY OF THE INVENTION

The object of the present invention is to overcome these drawbacks. This invention relates to a device for simply and efficiently controlling an aerodynamic surface or an empennage of a helicopter in such a way as to balance said helicopter in terms of pitch, while at the same time having control over the helicopter performance and the loading on the hub of the main rotor, getting around the effect of variations of center of gravity and meeting the aforementioned constraints that require the size of said aerodynamic surface to be limited.

To this end, according to the invention, the device for controlling an aerodynamic surface for balancing a helicopter in terms of pitch, said aerodynamic surface being controllable in terms of orientation and generating lift which is capable of creating a pitching action, and said helicopter comprising a main lift and propulsion rotor, the fore-and-aft cyclic pitch of the blades of which can be controlled by means of a pitch-control channel as a function of a command for the pitch control of the helicopter, is noteworthy in that it comprises control means associated with said pitch-control channel, for controlling said aerodynamic surface in such a way that it generates a lift which represents at least part of a first control command dependent on said pitch-control command, which part can be executed by said aerodynamic surface, and in that the combined pitching action of said aerodynamic surface and said main rotor represents said command for the pitch control of the helicopter.

Thus, by virtue of the invention, it becomes possible to gain control of the fore-and-aft attitude of the helicopter and therefore the aforementioned performance, by controlling said aerodynamic surface.

Now, the fore-and-aft attitude of the helicopter is connected, as is known, in equilibrium, with the fore-and-aft flapping (which acts directly on the loadings on the hub of the main rotor, as mentioned earlier) according to a relationship that is independent of the center of gravity.

Thus, by gaining control over the fore-and-aft attitude, control is also gained over the fore-and-aft flapping, independently of the center of gravity.

In consequence, by virtue of the invention, it is possible to balance the helicopter efficiently while at the same time gaining control over the aforementioned performance/hub loading compromise, and to do so independently of the center of gravity.

In addition, the device in accordance with the invention does not lead to disruption in the helicopter pitch control because the latter, which is obtained by the combined action of the main rotor and of the aerodynamic balancing surface, is truly representative, at every instant, of the pitch control command.

Furthermore, advantageously, said first control command is determined from the difference between said pitch-control command and a reference command that represents a reference control of said main rotor, such that, in equilibrium, the main rotor produces said reference control.

The inventive concept in accordance with the present invention may be implemented through two different types of solution. More specifically:

in a first type of solution, said control means are built into said pitch-control channel and control said aerodynamic surface and said main rotor simultaneously. In consequence, the device in accordance with the invention in this case is alone in performing two controls; and in a second type of solution, said control means are added to said pitch-control channel and control only said aerodynamic surface, which avoids modifying the pitch-control channel. This last type of solution can therefore be applied to any type of helicopter because it requires no modifications to said control channel.

Of course, there are various embodiments that can be envisaged for each of the two aforementioned types of solution.

As far as said first type of solution is concerned, in a first embodiment applied to a helicopter, in which the pitch-control channel comprises a linkage intended to transmit the pitch control command, advantageously, said control means comprise a bell crank with two branches, which bell crank is built into said linkage and intended to split the movement of the linkage between said branches so that it can be transmitted, a first of which branches is mechanically connected to a member for actuating the aerodynamic surface, controlling the orientation thereof, and the second branch of which is mechanically connected to a member for actuating the main rotor, controlling the fore-and-aft cyclic pitch thereof, the mechanical connection between said second branch and said member for actuating the main rotor being elastically restrained.

In this case, advantageously, said elastic restraint has an adjustable neutral point which represents said reference control, which makes it easy for the latter to be adjusted.

Furthermore, the device in accordance with the invention advantageously comprises, in this first embodiment:

means for adjusting said neutral point, as a function of characteristic parameters; and/or adjustable stops limiting the movement of the mechanical connection between the first branch of the bell crank and the member for actuating the aerodynamic surface; and/or means for adjusting said stops as a function of characteristic parameters; and/or a damper connected to the mechanical connection between the first branch of the bell crank and the member for actuating the aerodynamic surface.

Moreover, in a second embodiment, which relates to the first aforementioned type of solution, advantageously, said control means comprise a calculation unit which determines, on the one hand, a second control command transmitted to a member for actuating the aerodynamic surface, to control the orientation thereof and, on the other hand, a third control command transmitted to a member for actuating the main rotor, to control the fore-and-aft cyclic pitch thereof.

Furthermore, advantageously, said calculation unit performs:

a conversion between said control commands for, respectively, said aerodynamic surface and said main rotor, using a pitching moment efficiency conversion gain; and/or low-pass filtering of said second control command.

In addition, advantageously, said control device comprises means for measuring the angle through which the aerodynamic surface is turned, the angle thus measured being transmitted to said calculation unit to determine said third control command. As an alternative, said third control command is determined from said second control command.

Furthermore, as regards the second aforementioned type of solution, for which the control means are not built into the pitch-control channel but are simply added to it, these means comprise, in a particularly advantageous embodiment of the invention:

a calculation unit for determining a speed control command for the aerodynamic surface from the difference between the pitch-control command and the reference command; and means for actuating said aerodynamic surface in terms of speed as a function of the control command thus determined.

In this case, advantageously, the conversion of said difference which corresponds to a fore-and-aft cyclic pitch control command for the main rotor, into a value which corresponds to a control command for the aerodynamic surface is performed using a pitching moment efficiency conversion gain.

In addition, advantageously, said calculation unit determines said speed control command for the aerodynamic surface by performing, in succession, at least a conversion, an integration and a low-pass filtering of the difference between said pitch control command and said reference command.

Furthermore, the device in accordance with the invention advantageously comprises a calculation means for calculating said reference command as a function of the characteristic parameters, preferably as a function of at least some of the following parameters: the temperature, the speed, the load factor, the altitude and the vertical speed of the helicopter.

BRIEF DESCRIPTION OF THE DRAWINGS

The figures of the appended drawing will make it easy to understand how the invention may be achieved. In these figures, identical references denote similar components.

DETAILED DESCRIPTION OF THE PREFERRED EMBODIMENTS

Figure 1:
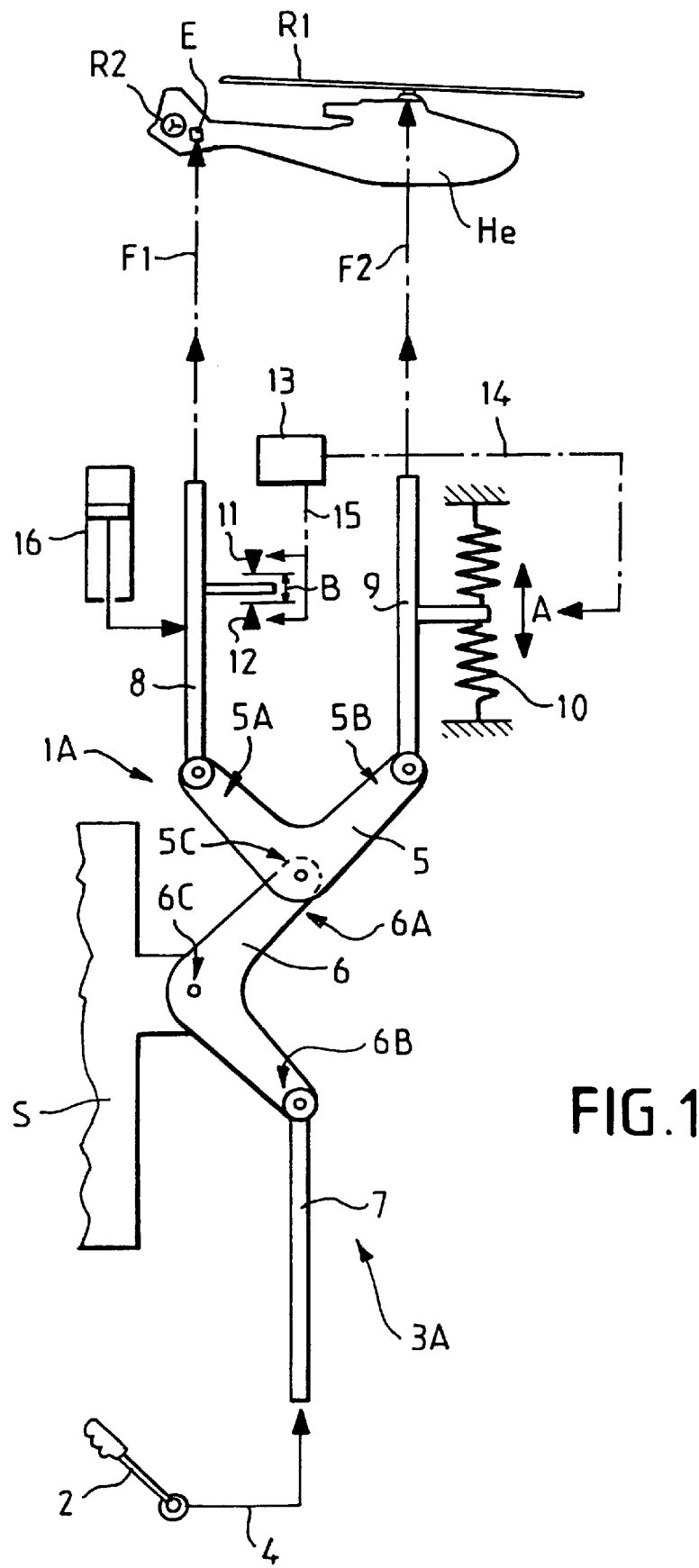
FIG. 1 diagrammatically shows a control device in accordance with the invention, in a first embodiment.
Figure 2:
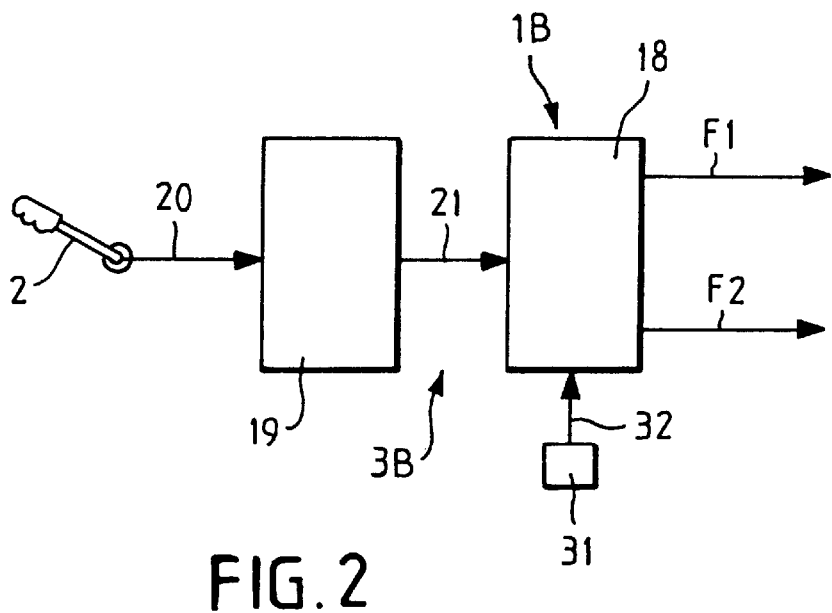
FIG. 2 diagrammatically shows a control device in accordance with the invention, in a second embodiment.
Figure 4:
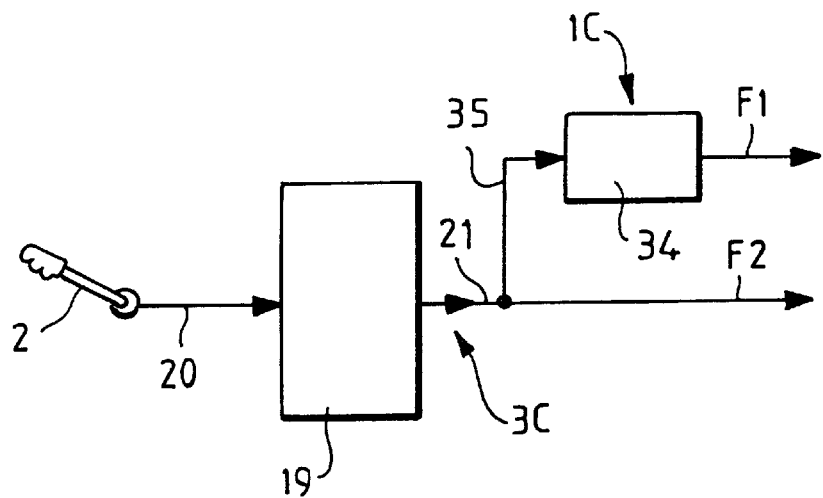
FIG. 4 diagrammatically shows a control device in accordance with the invention, in a third embodiment.

The control device in accordance with the invention and depicted diagrammatically in FIGS. 1, 2 and 4, in three different embodiments 1A, 1B and 1C, respectively, is intended to control an aerodynamic surface or an empennage E depicted diagrammatically in FIG. 1, of a helicopter He.

Said helicopter He comprises, in the known way, in particular:

a main lift and propulsion rotor R1, whose fore-and-aft cyclic pitch generating the pitch control of the helicopter He can be controlled, by means of a pitch-control channel 3A, 3B and 3C, by the actuation, by a pilot, not depicted, of the helicopter He, of a fore-aft cyclic stick 2; and an auxiliary countertorque rotor R2 intended to counter the torque induced by said main rotor R1.

The present invention is applied to an empennage E which is controllable in terms of orientation and which can generate lift creating a pitching action on the helicopter He and more precisely creating a nose-up action.

The purpose of the control device 1A, 1B and 1C is mainly to control said empennage E:

so that its nose-up action can efficiently oppose the nose-down moment generated by the rotor R1, particularly at high speed; and so as to obtain a satisfactory and controlled "performance/loading on the hub of the rotor R1" compromise independently of the variations in loading conditions (mass and center of gravity) of the helicopter He.

In order to achieve this, according to the invention, said control means 1A, 1B, 1C, which are associated with said pitch-control channel 3A, 3B and 3C respectively, are formed in such a way as to control said empennage E in such a way that it generates lift which represents at least part of a first control command, which part can be executed by said empennage E, said first control command being determined from the difference between a command for controlling the pitch of the helicopter and a reference command that represents a reference control of the fore-and-aft cyclic pitch of the main rotor R1, as specified below, and also in such a way that the combined pitching action of the empennage E and of said rotor R1 represents said pitch control command for the helicopter He.

Thus, by controlling the empennage E in accordance with the invention and dependent on the pitch-control command, it is possible in equilibrium to bring the pitch-control of the rotor R1 (or the fore-and-aft cyclic control) back onto a reference control, which can be determined as a function of characteristic parameters suited to the flight configuration in question, as will be seen below, and which guarantees fore-and-aft equilibrium of the helicopter, as far as the longitudinal attitude and the flapping are concerned, and which is independent of the center of gravity.

In consequence, the control device 1A, 1B, 1C provides simple and efficient management of the aforementioned "performance/loading on the hub of the rotor R1" compromise.

There will now be described, in turn, the three embodiments 1A, 1B and 1C of the control device in accordance with the invention, among which the embodiments 1A and 1B are respectively built into the corresponding pitch-control channels 3A and 3B and the embodiment 1C is simply added to the corresponding pitch-control channel 3C.

In the embodiment illustrated in FIG. 1, the invention is applied to a helicopter He depicted schematically to a smaller scale for reasons of clarity of the drawing, the pitch-control channel 3A (or fore-and-aft cyclic pitch control channel) of which comprises a linkage controlled by the actuation of the cyclic stick 2 by a pilot, not depicted, of said helicopter He, as indicated by an arrow 4.

In the known way, said linkage 3A is connected to at least one member, not depicted, for actuating the fore-and-aft cyclic pitch of the blades of the rotor R1, in order to transmit to it the pitch control command for a helicopter He, which command is generated by the actuation of said fore-and-aft cyclic stick 2.

In order to obtain the desired advantages and characteristics, said device 1A comprises control means which comprise, in particular, a bell crank 5. The latter, which has two branches 5A and 5B, is articulated at its center 5C to a branch 6A of another bell crank 6, the other branch 6B of which is articulated to a link rod 7 and which is connected at its center 6C to the structure S of the helicopter He.

The branch 5A is connected to a link rod 8 capable of controlling a member, not depicted, for actuating the empennage E, as illustrated by an arrow F1.

As for the branch 5B of the bell crank 5, it is connected to a link rod 9 capable of controlling the member for actuating the fore-and-aft cyclic pitch of the blades of the rotor R1, as illustrated by an arrow F2.

Furthermore, the link rod 9 is connected to a spring 10, the neutral point of which can be adjusted, as illustrated by a double-headed arrow A and specified hereinbelow, and which corresponds to the reference (fore-and-aft) cyclic pitch of the rotor R1.

According to the invention, the device 1A in accordance with the invention also comprises stops 11, 12 which are adjustable, as illustrated by a double-headed arrow B, and which are, for example, associated with the link rod 8.

Said device 1A additionally comprises a means 13 for adjusting said neutral point of the spring 10 and said stops 11 and 12, as indicated respectively by arrows 14 and 15, particularly as a function of the speed of the helicopter He and of its load factor and density, that is to say as a function of parameters that represent the flight configuration in question.

Furthermore, the device 1A comprises a damper 16 mounted in parallel with the control of the empennage E. This damper 16 is optional and is not needed if the stops 11 and 12 do not allow any play.

Also, associated with an actuation of the cyclic stick 2 is a resistance in the two branches 5B and 5A of the bell crank 5 : one generated by the spring 10 and the other by the damper 16.

By choosing appropriate technical characteristics of the said spring 10 and said damper 16, the device 1A allows the control to be transmitted first of all to the rotor R1 and for there then to be a slow transfer of the control from the rotor R1 to the empennage E. This then yields a filtering system which allows control to be achieved at high frequencies directly by the rotor R1 and allows equilibrium to be obtained (at low frequencies) by bringing the cyclic control of the rotor R1 back to said reference value.

In addition, the lengths of the branches 5A and 5B of the bell crank 5 can be altered and allow the respective sensitivities of the rotor R1 and of the empennage E to be adjusted.

It is assumed that no force is fed back from the empennage E or from the rotor R1 (by using servocontrols, for example). The distribution of the control of the cyclic stick 2 between the empennage E and the rotor R1 is therefore a function of the moment equilibrium of the bell crank 5.

This very simple device 1A therefore allows the aforementioned desired objectives to be achieved.

It will also be noted that:

at high speed, the empennage E has all the required efficiency. It balances the helicopter He as required, the main rotor R1 providing said reference control of the fore-and-aft cyclic pitch; and at low speed, the efficiency of the empennage E is practically zero. Thus, to avoid obtaining a dead range of control at very low speed, for which actuation of the linkage 3A would move the empennage E off one of its stops 11, 12 onto the other without controlling the rotor R1, it is possible, according to the invention, to set an unalterable single angle through which the empennage E is turned at low speed, by bringing the stops 11, 12 into a position that immobilizes the link rod 8 and therefore said empennage E.

Furthermore, as can be seen in FIG. 2, the second embodiment 1B of the invention comprises control means which, in particular, comprise a calculation unit 18 which determines:

a control command 6c transmitted to a member, not depicted, for actuating the empennage E, to control the orientation or turning thereof, as indicated by the arrow F1; and a control command θc transmitted to a member, not depicted, for actuating the cyclic pitch of the rotor R1, for controlling the latter, as indicated by the arrow F2, so that the combined pitching action of said empennage E and of said rotor R1 represents the pitch control command for the helicopter He.

Of course, said pitch-control command can be obtained directly by actuating the cyclic stick 2 of the helicopter He, like in the first embodiment 1A described earlier.

However, this second embodiment 1B of the invention is particularly applicable to a helicopter He which has a calculation unit 19, for example of a flyby-wire control system, which determines the pitch-control command from information received via a link 20 and which represents the actuation of the cyclic stick 2, and which transmits this pitch-control command via a link 21 to the calculation unit 18.

Of course, the calculation unit 18 depicted independently in FIG. 2 may also be built into the calculation unit 19.

Figure 3:
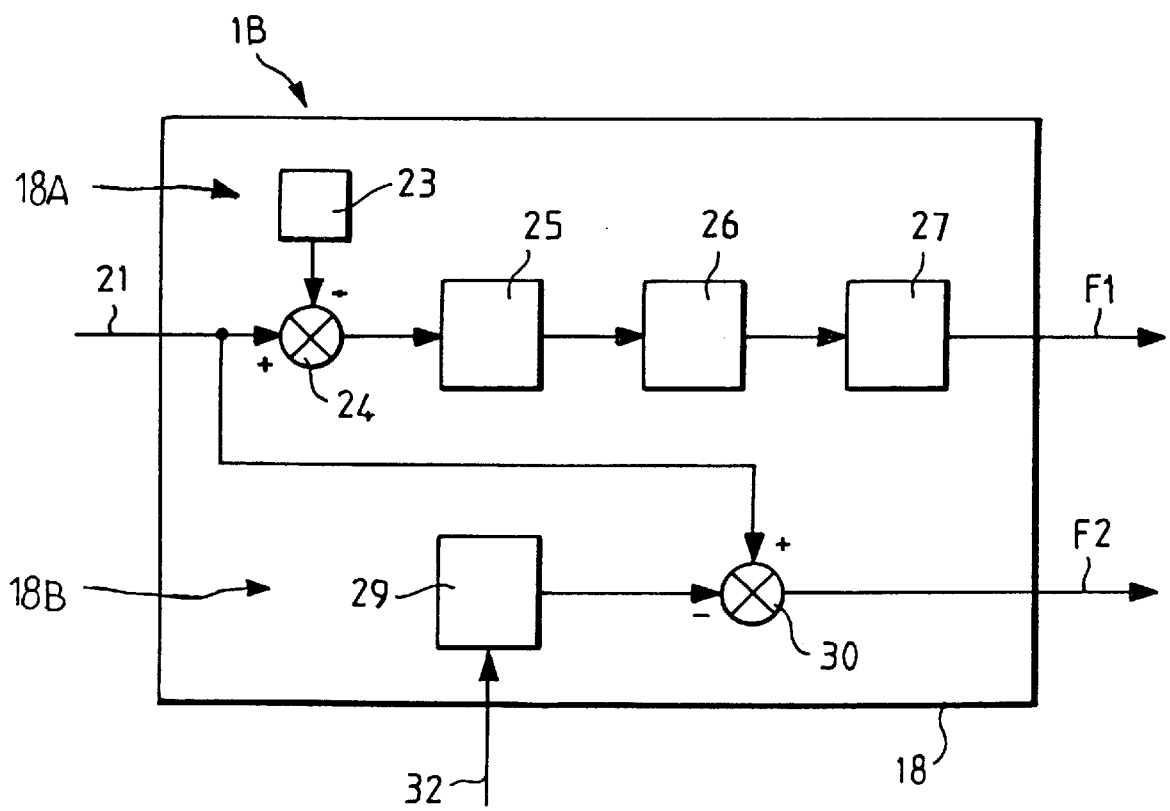
FIG. 3 is the block diagram of a calculation unit of the device of FIG. 2.

Said calculation unit 18 comprises, as depicted in FIG. 3:

a first calculation channel 18A for determining said control command 6c; and a second calculation channel 18B for determining said control command θc.

Said first calculation channel 18A comprises, in succession:

a calculation means 23 for determining, using a cyclic static model, a reference command, for example from characteristic values of the helicopter He, such as its effective speed, its altitude and/or its vertical speed. Said reference command, by definition, represents a reference command for the fore-and-aft cyclic pitch of the rotor R1;

a subtractor 24 for calculating the difference between said reference command and the pitch-control command received via the link 21;

a calculation means 25 for converting said difference, which corresponds to a command for controlling the fore-and-aft cyclic pitch of the rotor R1, into an equivalent command for controlling the empennage E. This conversion is performed by multiplying said difference by a pitching moment efficiency conversion gain, of the known type;

a low-pass filter 26 which filters the command thus calculated, because the empennage E performs only a static function; and a calculation means 27 for limiting the command to be transmitted to the empennage E to the value δc capable of being executed by said empennage E.

As to the calculation channel 18B, it comprises:

a calculation means 29 for converting a measured value specified hereinbelow of the angle through which the empennage E is turned, into a corrected command for controlling the rotor R1. This conversion is performed by dividing said measured value by the aforementioned pitching moment efficiency conversion gain; and a subtractor 30 which subtracts said corrected control command from the pitch-control command so as to obtain the command θc transmitted to the rotor R1.

The device 1B in accordance with the invention further comprises a measurement means 31 connected by a link 32 to the calculation means 29, for measuring the angle through which the empennage E is turned.

In an alternative form, not depicted, instead of using the measurement from the position sensor 31, use is made of the position reference formulated by the calculation means 27, by providing a link between the calculation means 27 and 29 for this purpose.

This device 1B therefore also, in equilibrium, splits the desired control between the empennage E and the rotor R1.

Said device 1B additionally has the following advantages:

a) it is transparent as far as the upstream controls are concerned, that is to say that the action of the empennage E does not alter the feelings upstream in the pitch-control channel 3B. The overall efficiency remains the same when the empennage E is not active. Thus, said device 1B requires no modification or adjustment to the control laws upstream;

b) the action of the empennage E does not cause any disruption in the control channel 3B;

c) the static model used by the calculation means 23 for determining the reference command is preferably defined in such a way as to manage the aforementioned "performance/loading on the hub of the rotor R1" compromise, but can also be defined in such a way as to achieve some other objective, such as, for example, keeping the equilibrium attitude zero for all possible flight scenarios; and d) the device 1B, in principle, statically dissociates the vertical speed from the fore-and-aft attitude, and this in particular makes it possible to prevent the empennage E from stalling in oblique flight with a high vertical speed.

Figure 5:
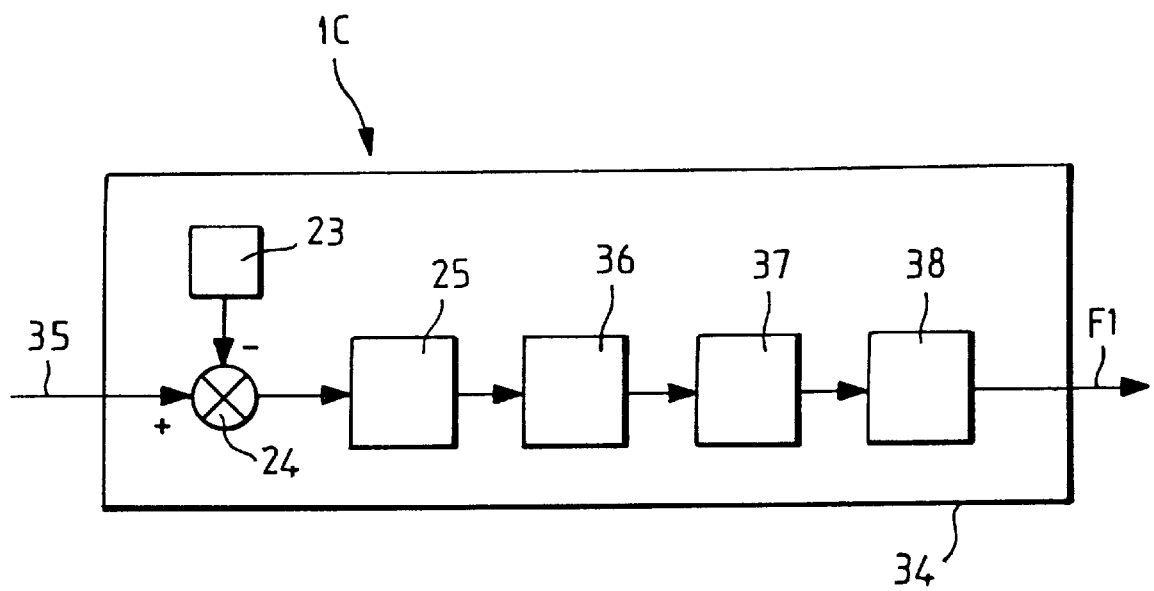
FIG. 5 is the block diagram of a calculation unit of the device of FIG. 4.

Furthermore, the third embodiment 1C of the device in accordance with the invention, and which is depicted in FIGS. 4 and 5, also applies to a helicopter He which has a calculation unit, of the kind of calculation unit 19 in the embodiment 1B.

However, the control device 1C can just as easily be applied to a pitch-control channel 3C of the fly-by-wire type, as it can to a channel of the mechanical type.

As mentioned earlier, in this third embodiment, the control device 1C is not built into said corresponding pitch-control channel 3C, as is the case for the devices 1A and 1B, but is simply added thereto, as depicted in FIG. 4.

According to the invention, said control device 1C comprises a calculation unit 34 which is depicted independently in FIG. 4, but which may also be built into the calculation unit 19.

Said calculation unit 34 comprises, according to the invention, as depicted in FIG. 5:

the aforementioned calculation means 23 of the embodiment 1B of FIG. 3, for determining the reference command;

the subtractor 24 which subtracts said reference command from the pitch-control command received via a link 35 connected to the link 21 and therefore determines the aforementioned difference;

the calculation means 25 for converting said difference which corresponds to a command for controlling the rotor R1, into an equivalent command for controlling the position of the empennage E. This conversion is formed by multiplying said difference by the aforementioned pitching moment efficiency conversion gain;

an integrator 36 which, from this position-control command, calculates a corresponding command for controlling the empennage E in terms of speed;

a low-pass filter 37 which filters the speed-control command thus calculated, because said empennage E performs only a static function; and a calculation means 38 which limits said command to the value capable of being executed by said empennage E and transmits this command, as illustrated by the arrow F1.

Said device 1C, therefore, in equilibrium at high speed, splits the desired control between the empennage E and the rotor R1, by bringing the latter to the reference control.

Said device 1C additionally has the same advantages c) and d) (mentioned earlier) as the device 1B.

Furthermore, as it is not built into the pitch-control channel 3C but added to it, without having to modify said channel, said control device 1C can be applied to any kind of helicopter, and this is true irrespective of its flight-control system (fly-by-wire or mechanical).

As this device 1C is independent of the cyclic control, the position of the stick in this case represents the cyclic pitch applied to the main rotor.

The empennage can also be used to meet foreand-aft static stability requirements (stick position increasing with the speed about the equilibrium point) of current aviation requirements "FAR" or "JAR". All that is needed for this is that the reference value formulated by the calculation means 23 should increase with the speed.

What is claimed is:

1. A device for controlling an aerodynamic surface for balancing a helicopter in terms of pitch, said aerodynamic surface being controllable in terms of orientation and generating lift for creating a pitching action, and said helicopter comprising a main lift and propulsion rotor, a fore-and-aft cyclic pitch of blades of said rotor being controllable by means of a pitch-control channel as a function of a command for the pitch control of the helicopter, said device comprising control means associated with said pitch-control channel, for controlling said aerodynamic surface to generate a lift which represents at least part of a first control command dependent on said pitch-control command, said part being executable by said aerodynamic surface, and wherein a combined pitching action of said aerodynamic surface and said main rotor represents said command for the pitch control of the helicopter.

2. A device as claimed in claim 1, wherein said first control command is determined from the difference between said pitch-control command and a reference command that represents a reference control of said main rotor.

3. A device as claimed in claim 2, wherein said control means are added to said pitch-control channel and control only said aerodynamic surface.

4. A device as claimed in claim 3, wherein said control means comprise:

a calculation unit for determining a speed control command for the aerodynamic surface from the difference between the pitch-control command and the reference command; and means for actuating said aerodynamic surface in terms of speed as a function of the control command thus determined.

5. A device as claimed in claim 4, wherein the conversion of said difference which corresponds to a fore-and-aft cyclic pitch control command for the main rotor, into a value which corresponds to a control command for the aerodynamic surface is performed using a pitching moment efficiency conversion gain.

6. A device as claimed in claim 4, wherein said calculation unit determines said speed control command for the aerodynamic surface by performing, in succession, at least a conversion, an integration and a low-pass filtering of the difference between said pitch control command and said reference command.

7. A device as claimed in claim 1, wherein said control means are built into said pitch-control channel and control said aerodynamic surface and said main rotor simultaneously.

8. A device as claimed in claim 7, wherein said pitch-control channel comprises a linkage for transmitting the pitch-control command, and wherein said control means comprise a bell crank including two branches, said bell crank being built into said linkage and splitting the movement of the linkage between said two branches to transmit the pitch-control command, a first of said two branches being mechanically connected to a member for actuating the aerodynamic surface and controlling the orientation thereof, and a second of said two branches being mechanically connected to a member for actuating the main rotor, controlling the fore-and-aft cyclic pitch thereof, and wherein the mechanical connection between said second branch and said member for actuating the main rotor is elastically restrained.

9. A device as claimed in claim 8, wherein said mechanical connection is restrained by an elastic restraint having an adjustable neutral point which represents a reference control of said main rotor.

10. A device as claimed in claim 9, which further comprises means for adjusting said neutral point of said elastic restraint, as a function of characteristic parameters.

11. A device as claimed in claim 10, wherein said characteristic parameters are at least some of the following parameters: the temperature, the speed, the load factor, the altitude and the vertical speed of the helicopter (He).

12. A device as claimed in claim 8, which comprises adjustable stops limiting the movement of the mechanical connection between the first branch of the bell crank and the member for actuating the aerodynamic surface.

13. A device as claimed in claim 12, which comprises means for adjusting said stops as a function of characteristic parameters.

14. A device as claimed in claim 8, which comprises a damper connected to the mechanical connection between the first branch of the bell crank and the member for actuating the aerodynamic surface.

15. A device as claimed in claim 7, wherein said control means comprise a calculation unit which determines, on the one hand, a second control command transmitted to a member for actuating the aerodynamic surface, to control the orientation thereof and, on the other hand, a third control command transmitted to a member for actuating the main rotor, to control the fore-and-aft cyclic pitch thereof.

16. A device as claimed in claim 15,
wherein said calculation unit performs a conversion between said control commands for, respectively, said aerodynamic surface and said main rotor, using a pitching moment efficiency conversion gain.

17. A device as claimed in claim 15,
wherein said calculation unit performs low-pass filtering of said second control command.

18. A device as claimed in claim 15,
which comprises means for measuring the angle through which the aerodynamic surface is turned, the angle thus measured being transmitted to said calculation unit to determine said third control command.

19. A device as claimed in claim 15,
wherein said calculation unit determines said third control command from said second control command.

20. A device as claimed in claim 1,
which comprises a calculation means for calculating said reference command as a function of the characteristic parameters.

21. A helicopter,
which comprises the device specified in claim 1.

* * * * *